(12) United States Patent
De Gelis

(10) Patent No.: US 7,383,692 B2
(45) Date of Patent: Jun. 10, 2008

(54) DEVICE FOR FIXING AN ADAPTER FOR AN ADD-ON PIECE TO A CONDENSER

(75) Inventor: Vincent De Gelis, Grenoble (FR)

(73) Assignee: A. Raymond et Cie, Grenoble (FR)

(*) Notice: Subject to any disclaimer, the term of this patent is extended or adjusted under 35 U.S.C. 154(b) by 255 days.

(21) Appl. No.: 10/565,336

(22) PCT Filed: Jul. 8, 2004

(86) PCT No.: PCT/EP2004/007451

§ 371 (c)(1),
(2), (4) Date: Jan. 19, 2006

(87) PCT Pub. No.: WO2005/015109

PCT Pub. Date: Feb. 17, 2005

(65) Prior Publication Data

US 2006/0174644 A1  Aug. 10, 2006

(30) Foreign Application Priority Data

Jul. 23, 2003  (DE) ................................ 103 33 381

(51) Int. Cl.
*F25D 19/00* (2006.01)
(52) U.S. Cl. ......................................... 62/295; 62/298
(58) Field of Classification Search ............... 62/251.1, 62/263, 295, 298, 444; 165/67; 180/68.4
See application file for complete search history.

(56) References Cited

U.S. PATENT DOCUMENTS

| 3,490,201 | A | * | 1/1970 | Colvin et al. ................. 95/113 |
| 4,113,004 | A | * | 9/1978 | Rush et al. ..................... 165/7 |
| 4,134,743 | A | * | 1/1979 | Macriss et al. ............... 95/113 |
| 4,729,774 | A | * | 3/1988 | Cohen et al. ................ 96/123 |
| 5,107,688 | A |   | 4/1992 | Johnson |
| 5,632,954 | A | * | 5/1997 | Coellner et al. ............... 422/4 |
| 5,943,874 | A | * | 8/1999 | Maeda ........................ 62/271 |
| 6,199,394 | B1 | * | 3/2001 | Maeda ........................ 62/271 |
| 6,318,106 | B1 | * | 11/2001 | Maeda ........................ 62/271 |

(Continued)

FOREIGN PATENT DOCUMENTS

DE        4232019       10/1993

(Continued)

*Primary Examiner*—Mohammad M. Ali
(74) *Attorney, Agent, or Firm*—Baker & Daniels

(57) ABSTRACT

Disclosed is a device (1) for fixing an adapter (3) for an add-on piece to a condenser that is provided with deformable lamellae located between coolant conduits. Said device (1) comprises an adapter-supporting piece (2) that is provided with the adapter (3) for the add-on piece. An opposite piece (5) is also provided. The adapter-supporting piece (2) and the opposite piece (5) encompass a number of facing, wedge-shaped protrusions (11, 13). A locking arrangement (6) is embodied on the adapter-supporting piece (2) and the opposite piece (5) for connecting the adapter-supporting piece (2) and the opposite piece (5). The protrusions (11, 13) engage with the lamellae of the condenser so as to deform the same when the adapter-supporting piece (2) and the opposite piece (5) are connected, resulting in stable securing of the device (1) while the connection is formed by the locking arrangement (6).

9 Claims, 4 Drawing Sheets

U.S. PATENT DOCUMENTS

| | | | |
|---|---|---|---|
| 6,324,860 B1 * | 12/2001 | Maeda et al. | 62/271 |
| 6,334,316 B1 * | 1/2002 | Maeda et al. | 62/94 |
| 6,442,951 B1 * | 9/2002 | Maeda et al. | 62/94 |
| 6,575,228 B1 * | 6/2003 | Ragland et al. | 165/54 |
| 6,581,402 B2 * | 6/2003 | Maisotsenko et al. | 62/315 |
| 6,622,508 B2 * | 9/2003 | Dinnage et al. | 62/271 |
| 6,705,096 B2 * | 3/2004 | Maisotsenko et al. | 62/121 |
| 6,915,655 B2 * | 7/2005 | Lee et al. | 62/271 |
| 6,918,263 B2 * | 7/2005 | Lee et al. | 62/271 |
| 7,073,566 B2 * | 7/2006 | Lagace et al. | 165/8 |

FOREIGN PATENT DOCUMENTS

| | | |
|---|---|---|
| DE | 297 12 351 U1 | 10/1997 |
| DE | 100 81 226 T1 | 8/2001 |
| EP | 0401590 | 10/1992 |
| EP | 1439364 | 7/2004 |
| JP | 11-132208 | 5/1999 |
| JP | 2003247732 A * | 9/2003 |
| SU | 578765 A * | 6/1975 |
| WO | WO93/04321 A1 | 3/1993 |

* cited by examiner

DEVICE FOR FIXING AN ADAPTER FOR AN ADD-ON PIECE TO A CONDENSER

BACKGROUND OF THE INVENTION

The invention concerns a device for fixing an adapter for an add-on piece to a condenser as recited in the preamble to Claim 1.

Such a device is known from EP 0 401 500 A1. In the prior device, U-shaped side parts provided with L-shaped brackets are present as supporting piece and opposite piece, and comprise a number of facing, wedge-shaped protrusions and a locking arrangement for connecting the brackets. The side parts embrace outer edge faces of a condenser.

Known for example from U.S. Pat. No. 5,107,688 is a device for fixing an adapter for an add-on piece to coolant conduits of a condenser on the back of a refrigerator. This device engages latchingly in mutually opposite coolant conduits. However, the use of this device is limited to condensers that are round in cross section and have coolant conduits at least portions of which are exposed for latching the device.

The object of the invention is to create a device that can be fixed stably in the central region of a condenser comprising lamellae that are deformable between coolant conduits.

SUMMARY OF THE INVENTION

This object is achieved according to the invention, in a device of the aforesaid kind, by means of the characterizing features of Claim 1.

Particularly good self-securing is achieved thereby, with comparatively little lever action in the region of the transverse portions but adequate stabilization in the region of the edge portions.

In a development of the inventive device, advantageously implemented as protrusions on the transverse portions are inner lugs with flat faces oriented parallel to the longitudinal direction of the transverse portion concerned. In this way the displacement of the lamellae occurs primarily in the longitudinal direction of the transverse portions, with the result that the forces necessary to effect engagement are relatively slight.

In a continuation of the aforesaid development, to achieve uniform engagement behavior it is advantageously provided that the inner lugs are implemented with a wedge-shaped conformation that is symmetrical with respect to a center line.

In the aforesaid advantageous configuration, in a further improvement supplementary or alternative to the foregoing continuation, advantageously implemented as protrusions on edge portions are outer lugs with flat faces oriented parallel to the longitudinal direction of the edge portion concerned. In this way the displacement of the lamellae occurs primarily in the longitudinal direction of the edge portions, with the result that here, too, the forces necessary to effect engagement are relatively slight.

In the latter improvement, for effective self-clamping to the condenser, in one embodiment a number of outer lugs are configured with a planar, beveled operative face.

In a continuation of the latter embodiment, it is advantageously provided that a number of outer lugs are each configured with an angular, wedge-shaped beveled operative face, which, when the adapter-supporting piece and the opposite piece are connected to each other, is disposed opposite an assigned outer lug having a planar beveled operative face. This enables the outer lugs to extend well into the condenser, thus procuring more secure retention of the adapter-supporting piece and the opposite piece on the condenser.

In a further advantageous improvement of the inventive device, it is provided that the locking arrangement comprises at least one locking tongue and at least one tongue receptacle, a locking tongue being insertable in an associated tongue receptacle and there being implemented on the tongue receptacle an immobilizing part with which a detent lug implemented on the locking tongue comes into engagement when the locking tongue is inserted in the tongue receptacle. This procures a simple, reliable connection between the adapter-supporting piece and the opposite piece.

In an improvement of the aforesaid configuration, the tongue receptacle comprises an unlocking recess through which a tool for releasing the engagement between a locking tongue and the associated immobilizing part can be passed. The connection between the adapter-supporting piece and the opposite piece can thus be released relatively easily as needed.

In a further advantageous improvement of the inventive device, it is provided that in the assembled arrangement of the adapter-supporting piece and the opposite piece, the adapter for the add-on piece has the use of a support face extending across a receiving space configured between the adapter-supporting piece and the opposite piece, and the opposite piece has the use of at least two support webs disposed on either side of the adapter for the add-on piece when the adapter-supporting piece and the opposite piece are in their assembled arrangement and whose respective single faces confronting the receiving space lie in the plane of the support face of the adapter for the add-on piece. In this way, the device, when arranged as intended, bears against an operative face of the condenser over a comparatively extensive region of contact comprising the support face of the adapter for the add-on piece and the face of each support web that confronts the receiving space, thereby stabilizing the engagement of the protrusions with the lamellae.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
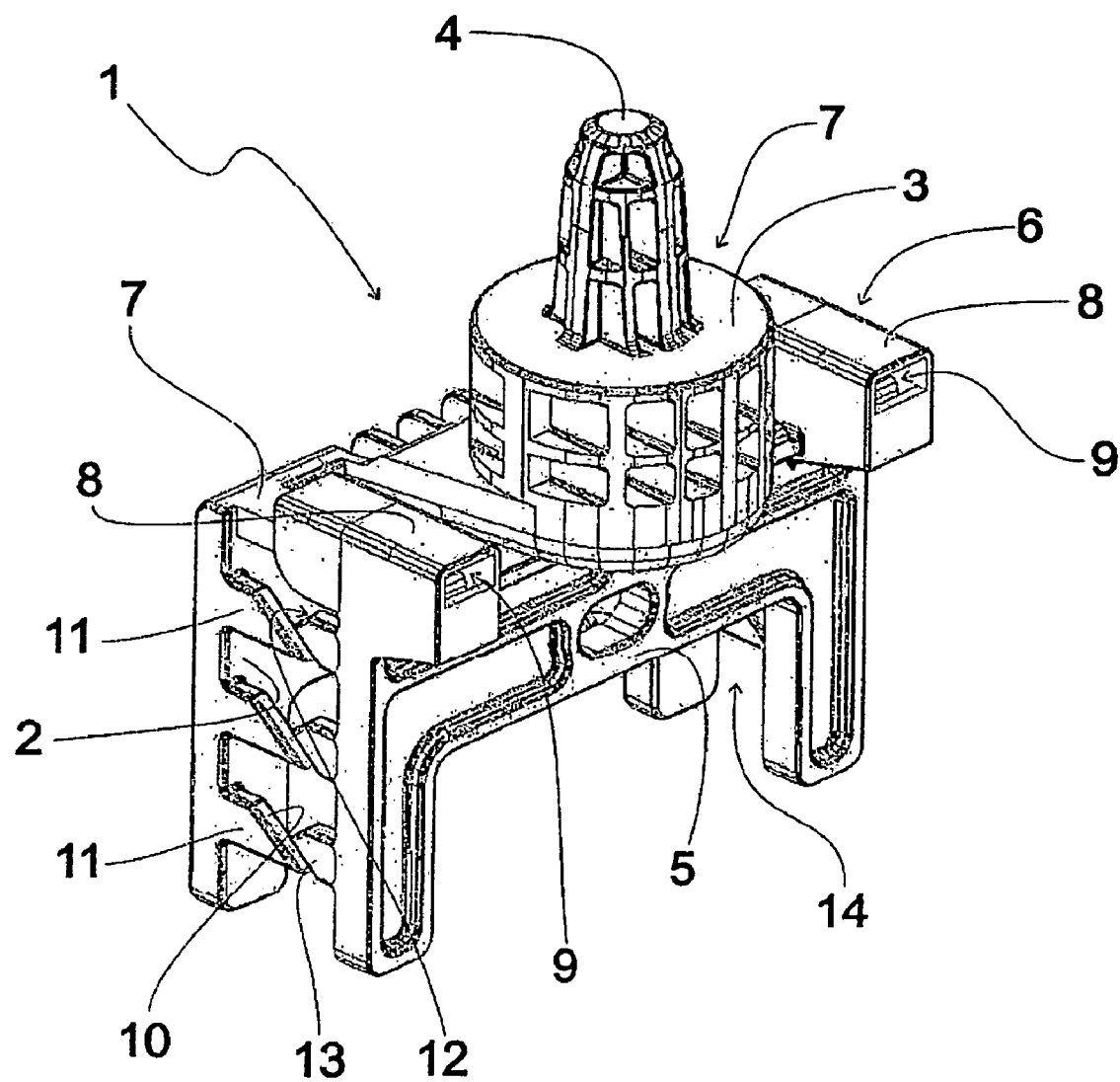
FIG. 1 is a perspective view of a condenser fixing device to be fixed to a condenser of a motor vehicle.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DESCRIPTION OF THE PRESENT INVENTION

FIG. 1 shows in perspective view, as an exemplary embodiment, an inventive condenser fixing device 1 to be fixed to a motor-vehicle condenser (not shown in FIG. 1) comprising, between substantially parallel coolant conduits, a plurality of thin-walled, relatively easily deformable lamellae extending between adjacent coolant conduits. The condenser fixing device 1 is provided with an adapter-supporting piece 2 comprising an adapter 3 for an add-on piece. The adapter 3 for the add-on piece is implemented for example with a connecting stud 4 that serves to connect an add-on piece (not illustrated in FIG. 1) to condenser fixing device 1 and ultimately to the condenser.

In the assembled arrangement of condenser fixing device 1 illustrated in FIG. 1, adapter-supporting piece 2 is connected to an opposite piece 5, for which purpose condenser fixing device 1 is provided with a locking arrangement 6 comprising, in the depicted exemplary embodiment, two locking tongues 7 implemented on adapter-supporting piece 2 and two tongue receptacles 8 implemented on opposite piece 5. Locking tongues 7 and tongue receptacles 8 are disposed on either side of the adapter 3 for the add-on piece in the respective edge regions of adapter-supporting piece 2 and opposite piece 5.

As is evident from FIG. 1, tongue receptacles 8 comprise, on their faces that are turned away from adapter-supporting piece 2 when condenser fixing device 1 is in the assembled arrangement, unlocking recesses 9 through which a tool can be passed to engage with the locking tongues 7 and to release the connection between adapter-supporting piece 2 and opposite piece 5.

Implemented on adapter-supporting piece 2 and opposite piece 5 are a number of protrusions that face one another when condenser fixing device 1 is in the assembled arrangement. The protrusions include, on the edges of adapter-supporting piece 2, outer lugs 11 configured with a planar beveled operative face 10, and on the edges of opposite piece 5, outer lugs 13 configured with an angular, wedge-shaped beveled operative face 12. Planar beveled operative faces 10 are oriented so that they face adapter 3 for the add-on piece.

It is apparent from FIG. 1 that when condenser fixing device 1 is in the assembled arrangement, a portion of the wedge-shaped beveled operative face 12 of each outer lug 13 of opposite piece 5 is snugly adjacent and substantially parallel to the planar beveled operative face 10 of the associated outer lug 11 of adapter-supporting piece 2, and a receiving space 14 for receiving the condenser is formed between adapter-supporting piece 2 and opposite piece 5. The depth of receiving space 14 corresponds to the thickness of the condenser to which condenser fixing device 1 is to be fixed.

Figure 2:
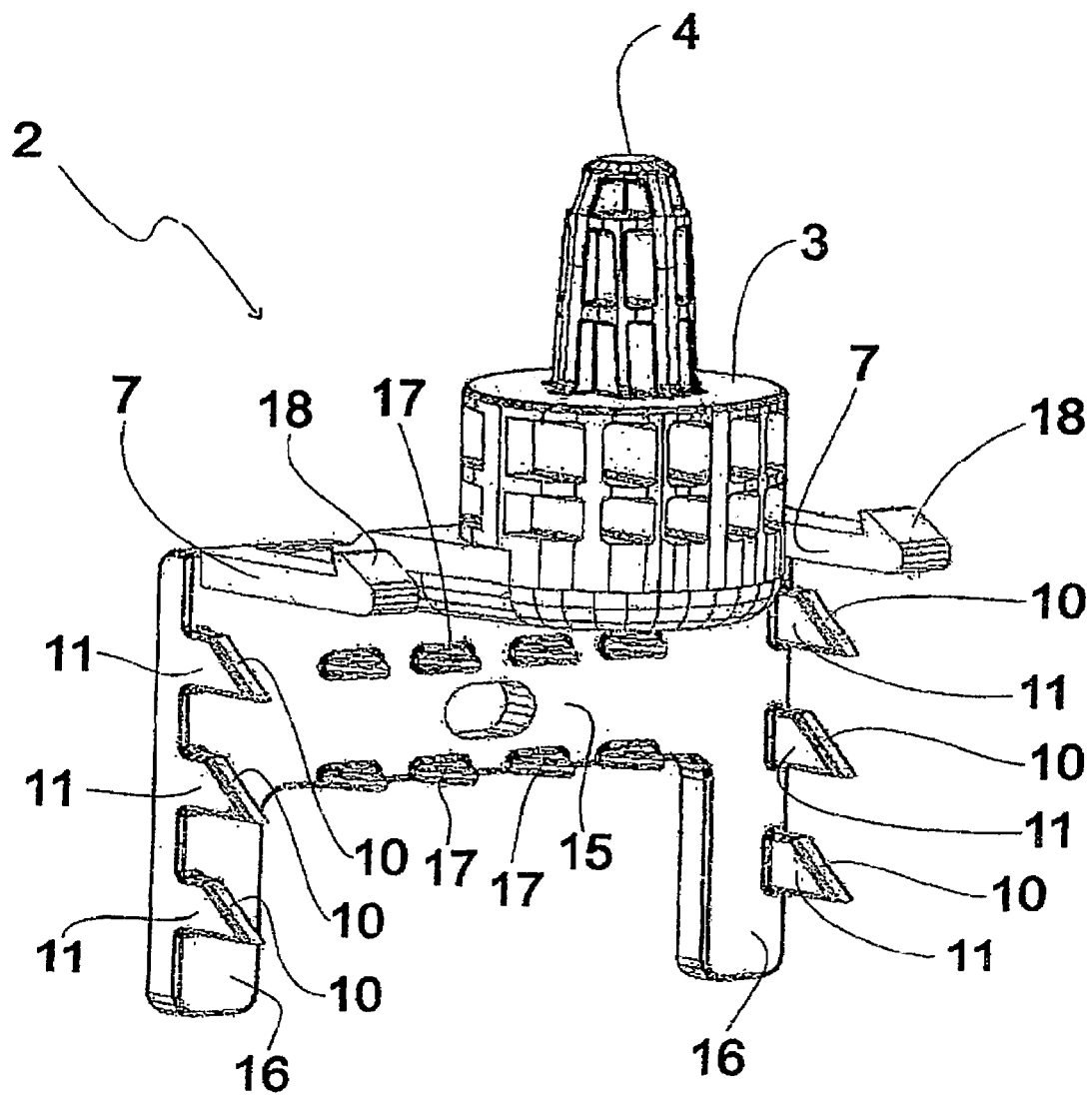
FIG. 2 is a perspective view of an adapter-supporting piece of the condenser fixing device according to FIG. 1.

FIG. 2 is a perspective view of the adapter-supporting piece 2 of the condenser fixing device 1 according to FIG. 1. It is apparent from FIG. 2 that adapter-supporting piece 2 has a U-shaped configuration comprising a transverse portion 15 and two edge portions (legs) 16 extending from the edges of and substantially at right angles to transverse portion 15. Implemented as protrusions on transverse portion 15 are a number of inner lugs 17, which in the exemplary embodiment of FIG. 2 are disposed in two rows parallel to each other and to the longitudinal direction of transverse portion 15.

Inner lugs 17 are configured with two flat faces oriented parallel to the longitudinal direction of transverse portion 15 and with a wedge-shaped configuration that is symmetrical with respect to a center line oriented at right angles to the longitudinal direction of transverse portion 15. The spacing between the rows of inner lugs 17 is adapted so that, when the condenser fixing device 1 is fixed to a condenser, the inner lugs 17 are positioned to either side of a coolant conduit.

Outer lugs 11 are disposed on the outer faces of legs 16 which are oriented at right angles to the longitudinal direction of transverse portion 15. Outer lugs 17 are configured with flat faces oriented parallel to the longitudinal direction of their respective edge portion 16 and have a spacing so adapted that, when condenser fixing device 1 is fixed to the condenser, outer lugs 17 are each positioned on one or another side of a coolant conduit.

It can further be appreciated from the representation of FIG. 2 that the locking tongues 7 are each configured at its free end with a detent lug 18, the projecting portions of the detent lugs 18 being oriented so that they point away from legs 16.

Figure 3:
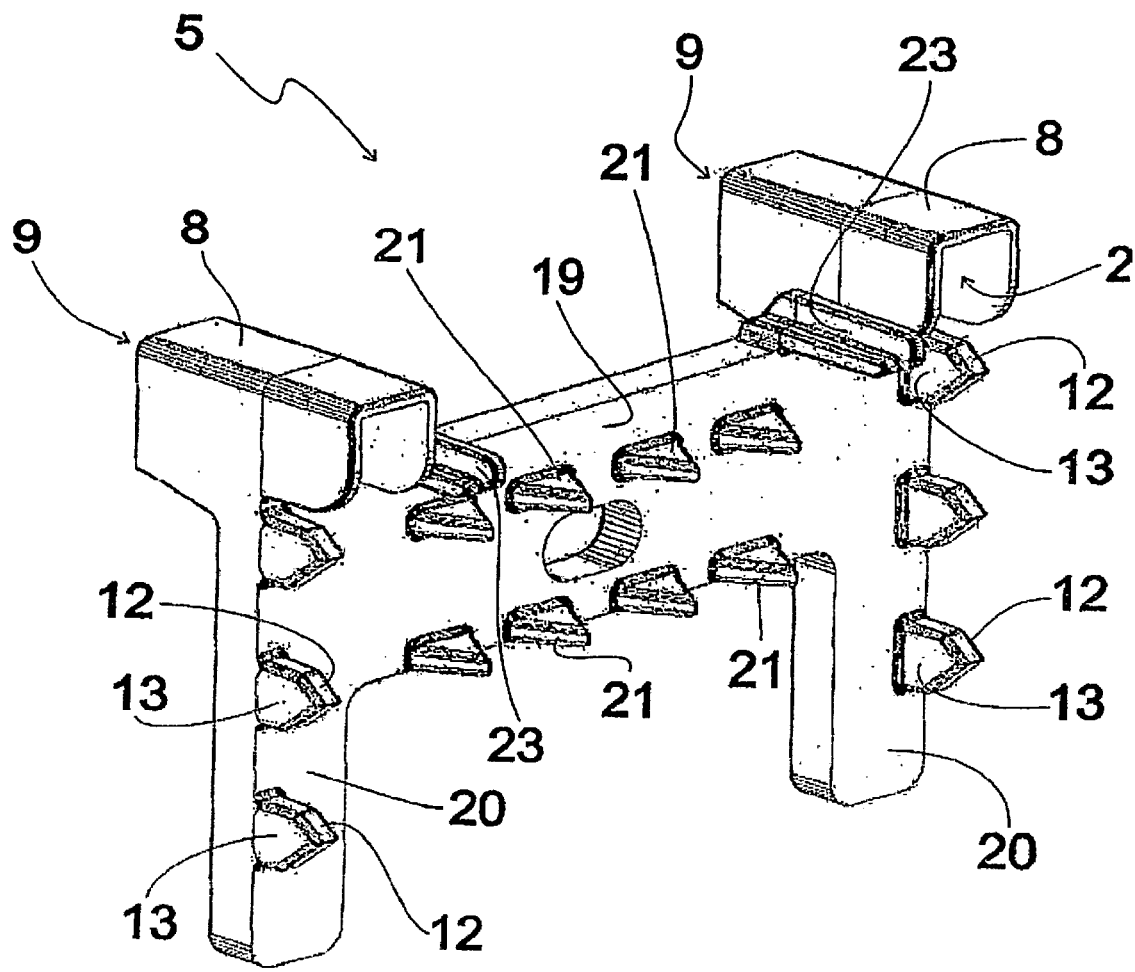
FIG. 3 is a perspective view of an opposite piece of the condenser fixing device according to FIG. 1.

FIG. 3 is a perspective view of the opposite piece 5 of the condenser fixing device 1 according to FIG. 1. It is apparent from FIG. 3 that opposite piece 5 also has a U-shaped configuration comprising a transverse portion 19 and two edge portions (legs) 20 extending from the sides of and substantially at right angles to transverse portion 19. In the assembled arrangement of condenser fixing device 1, transverse portions 15, 19 and legs 16, 20 of adapter-supporting piece 2 and of opposite piece 5 are opposite to and face one another.

Implemented on transverse portion 19 of opposite piece 5, correspondingly to transverse portion 15 of adapter-supporting piece 2, are a number of symmetrically wedge-shaped inner lugs 21 comprising flat faces and disposed, in the exemplary embodiment of FIG. 3, opposite assigned inner lugs 17 of adapter-supporting piece 2 when condenser fixing device 1 is in its assembled arrangement.

In addition, outer lugs 13 disposed on the edge portions 20 of opposite piece 5 are positioned correspondingly to outer lugs 11 of adapter-supporting piece 2. In the assembled arrangement of condenser fixing device 1, portions of wedge-shaped beveled operative faces 12 of outer lugs 13 of opposite piece 5 come into a close, adjacent arrangement with the opposite planar beveled operative faces 10 of outer lugs 11 of adapter-supporting piece 2.

Figure 4:
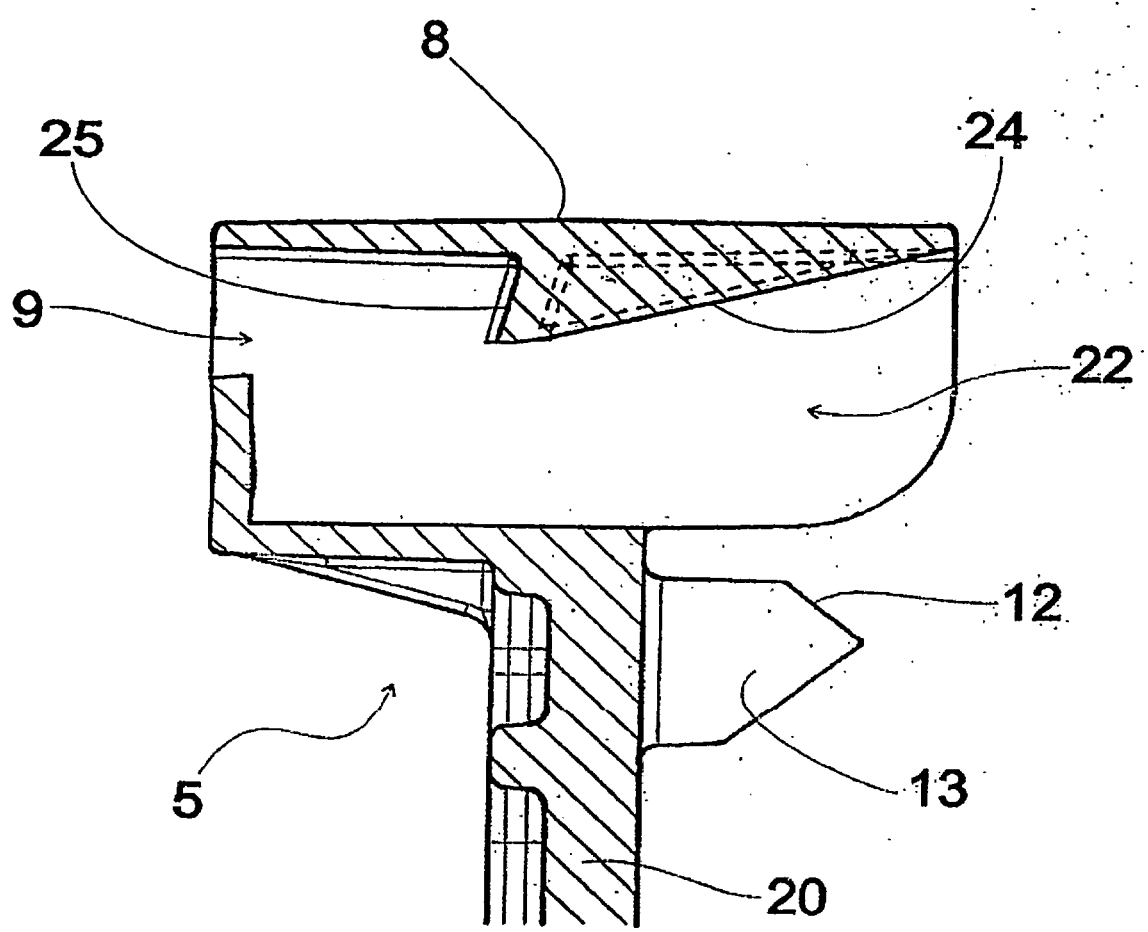
FIG. 4 is a sectional view showing the structure of a tongue receptacle of the opposite piece according to FIG. 3.

It can also be appreciated from the representation of FIGS. 3 and 4 that the tongue receptacles 8, as part of the locking arrangement 6, are each provided with a tongue insertion recess 22 disposed opposite the associated unlocking recess 9 and designed for the insertion of the locking tongues 7 implemented on adapter-supporting piece 2.

It is further apparent from FIG. 3 that opposite piece 5 comprises, adjacent each tongue receptacle 7, a support web 23 that points with its free end in the same direction as outer lugs 13 and inner lugs 21. The face of support web 23 that confronts receiving space 14 when condenser fixing device 1 is in its assembled arrangement lies in the plane of the side of the adapter 3 for an add-on piece that also faces receiving space 14, thereby creating and defining a seat for a condenser disposed in receiving space 14.

FIG. 4 shows in sectional view the structure of a tongue receptacle 8 of the opposite piece 5 illustrated in FIG. 3. Between unlocking recess 9 and tongue insertion recess 22, tongue receptacle 8 comprises a slide web 24 that slopes in the direction of edge portion 20 from tongue insertion recess 22 to unlocking recess 9 and which is terminated by an immobilizing web 25 as an immobilizing part.

When locking tongues 7 are inserted in tongue receptacles 8, detent lugs 18 thus slide along slide webs 24 until they extend latchingly behind immobilizing webs 25. In this assembled arrangement of condenser fixing device 1, adapter-supporting piece 2 and opposite piece 5 are firmly connected to each other. To release the connection, tools are inserted through unlocking recesses 9 to release the engagement of detent lugs 18 and immobilizing webs 25.

The mounting of condenser fixing device 1 in a manner that is stable over the long term, even against vibrations, on a condenser comprising deformable lamellae extending between coolant conduits is performed as follows. Adapter-supporting piece 2 and opposite piece 5 are seated on an edge face of the condenser via the faces of adapter 3 for an add-on piece confronting receiving space 14 or via support webs 23, and locking tongues 7 are inserted in tongue receptacles 8.

Adapter-supporting piece 2 and opposite piece 5 are then brought together by pressing outer lugs 11, 13 and inner lugs 17, 21 into the lamellae, which deform as a result.

Once detent lugs 18 have latched onto locking webs 25, the mutually confronting faces of adapter-supporting piece 2 and opposite piece 5 bear against the respective outer faces of the condenser. The faces of adapter 3 for an add-on piece and of support webs 22 that confront receiving space 14 rest on the edge face of the condenser. Outer lugs 11, 13 and inner lugs 17, 21 are engaged with the deformed lamellae of the condenser in a clearance-free manner that is stable over the long term, and secure not only the connection created by locking arrangement 6, but also, by their mutually perpendicular orientation, the engagement with the lamellae of the condenser.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for securing an adapter for an add-on piece to a refrigerant condenser, said device comprising:
    an adapter-supporting piece for connecting to a said add-on piece, said adapter-supporting piece being U-shaped and comprising two first longitudinal lateral legs and a first elongated transverse portion extending between said first legs, said first legs and first transverse portion including a plurality of first protrusions;
    an opposite piece lockingly connected to said adapter-supporting piece, said opposite piece being U-shaped and comprising two second longitudinal lateral legs and a second elongated transverse portion extending between said second legs, said second legs and said second transverse portion including a plurality of second protrusions; and
    pairs of said first and second protrusions disposed opposite to and facing one another.

2. The device of claim 1 wherein said first and second protrusions located on said first and second transverse portions comprise inner lugs having flat faces oriented parallel to the longitudinal direction of said respective first and second transverse portions.

3. The device of claim 2 wherein said inner lugs each have a wedge-shaped configuration, said configuration having a center line, said lugs being symmetrical with respect to said center lines.

4. The device of claim 1 wherein said first and second protrusions located on said first and second legs comprise outer lugs having flat faces oriented parallel to the longitudinal direction of said respective first and second legs.

5. The device of claim 4 wherein said outer lugs located on said first legs each have a planar beveled face.

6. The device of claim 5 wherein said outer lugs located on said second legs each have a wedge-shaped beveled face, each said outer lugs with a said wedge-shaped beveled face disposed opposite to and facing an outer lug with a said planar beveled face.

7. The device of claim 1 wherein said opposite piece and said adapter-supporting piece each have one of a locking tongue and a tongue receptacle, said tongue being insertable into said receptacle, said receptacle having an immobilizing part, said tongue having a detent lug, whereby, when said tongue is inserted into said receptacle, said detent lug lockingly engaging said immobilizing part.

8. The device of claim 7 wherein said receptacle includes an unlocking recess for receiving a tool to release said detent lug from said immobilizing part.

9. The device of claim 1 wherein said adapter-supporting piece and said opposite piece define a receiving space located therebetween, a support web disposed on either side of said first transverse portion whereby a said adapter can be can be mounted between said support webs.

* * * * *